US012686761B2

(12) United States Patent
Saito et al.

(10) Patent No.: US 12,686,761 B2
(45) Date of Patent: Jul. 21, 2026

(54) CHARGING ROLL FOR ELECTROPHOTOGRAPHIC DEVICE AND METHOD FOR MANUFACTURING CHARGING ROLL FOR ELECTROPHOTOGRAPHIC DEVICE

(71) Applicant: Sumitomo Riko Company Limited, Aichi (JP)

(72) Inventors: Yoshihiro Saito, Aichi (JP); Shimpei Miyagawa, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 483 days.

(21) Appl. No.: 18/500,102

(22) Filed: Nov. 1, 2023

(65) Prior Publication Data

US 2024/0059875 A1     Feb. 22, 2024

Related U.S. Application Data

(63) Continuation of application No. PCT/JP2022/023760, filed on Jun. 14, 2022.

(30) Foreign Application Priority Data

Jun. 29, 2021     (JP) ................................. 2021-107167

(51) Int. Cl.
*G03G 15/02* (2006.01)
*C08K 3/04* (2006.01)
(Continued)

(52) U.S. Cl.
CPC .................. *C08L 9/00* (2013.01); *C08K 3/04* (2013.01); *C08L 9/02* (2013.01); *F16C 13/00* (2013.01); *G03G 15/0233* (2013.01)

(58) Field of Classification Search
CPC ............... G03G 15/02; G03G 15/0233; G03G 15/0818; C08L 9/00; C08L 9/02; C08L 71/03; C08K 3/04; F16C 13/00
See application file for complete search history.

(56) References Cited

U.S. PATENT DOCUMENTS

| | | | |
|---|---|---|---|
| 11,347,156 B2 | 5/2022 | Kurachi et al. | |
| 2020/0310264 A1* | 10/2020 | Kurachi | ................. G03G 5/105 |
| 2021/0048759 A1* | 2/2021 | Hino | ....................... F16C 13/00 |

FOREIGN PATENT DOCUMENTS

| | | | | |
|---|---|---|---|---|
| JP | 2018005116 A | * | 1/2018 | ......... G03G 15/0233 |
| JP | 2020166208 | | 10/2020 | |
| JP | 2020166259 | | 10/2020 | |

OTHER PUBLICATIONS

Machine translation of Jp 2018-5116A, Narita et al., published on Jan. 11, 2018 (Year: 2018).*

(Continued)

*Primary Examiner* — Sophia S Chen
(74) *Attorney, Agent, or Firm* — JCIPRNET

(57) ABSTRACT

The charging roll 10 for an electrophotographic device includes a shaft 12, an elastic layer 14 formed on the outer peripheral surface of the shaft 12, and a top layer 16 formed on the outer peripheral surface of the elastic layer 14. The elastic layer 14 is constituted of a high-resistance first phase 14a in which the surface resistance value is $1.6 \times 10^{14}$ $\Omega$·cm to $8.8 \times 10^{15}$ $\Omega$·cm (inclusive), and a low-resistance second phase 14b in which the surface resistance value is $1.3 \times 10^2$ $\Omega$·cm to $4.9 \times 10^3$ $\Omega$·cm (inclusive). The second phase 14b contains two types of carbon black: carbon black A, of which the amount of DBP absorption is 115 cm³/100 g to 160 cm³/100 g (inclusive); and carbon black B, of which the amount of DBP absorption is 70 cm³/100 g to 110 cm³/100 g (inclusive).

11 Claims, 2 Drawing Sheets

Figure 1:
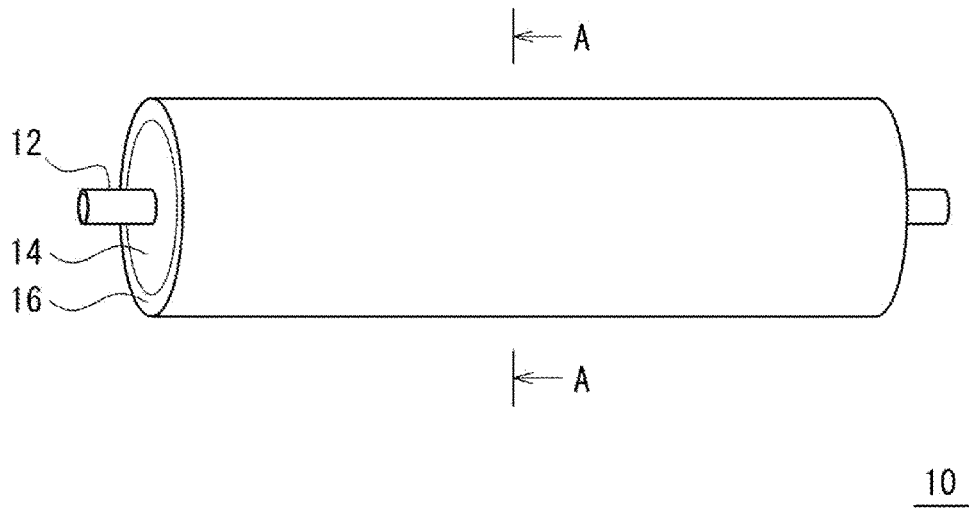
Figure 1:
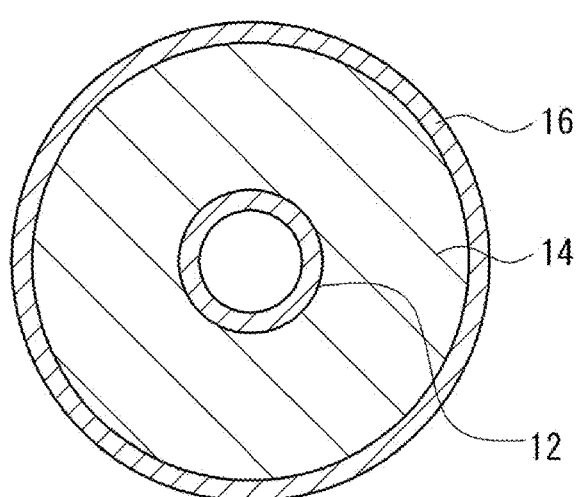

(51) Int. Cl.
    *C08L 9/00*         (2006.01)
    *C08L 9/02*         (2006.01)
    *F16C 13/00*       (2006.01)

(56)              References Cited

OTHER PUBLICATIONS

"International Search Report (Form PCT/ISA/210) of PCT/JP2022/023760", mailed on Aug. 9, 2022, with English translation thereof, pp. 1-4.

* cited by examiner (a)

10

(b)

10

CHARGING ROLL FOR ELECTROPHOTOGRAPHIC DEVICE AND METHOD FOR MANUFACTURING CHARGING ROLL FOR ELECTROPHOTOGRAPHIC DEVICE

CROSS-REFERENCE TO RELATED APPLICATION

This application is a continuation application of International Application number PCT/JP2022/023760 on Jun. 14, 2022, which claims the priority benefit of Japan Patent Application No. 2021-107167, filed on Jun. 29, 2021. The entirety of each of the above-mentioned patent applications is hereby incorporated by reference herein and made a part of this specification.

TECHNICAL FIELD

The present disclosure relates to a charging roll for an electrophotographic device that is suitably used in electrophotographic devices such as copiers, printers and facsimiles in which an electrophotographic method is adopted and a method for manufacturing a charging roll for an electrophotographic device.

BACKGROUND ART

In charging rolls of electrophotographic devices, a method in which a large amount of a conductive agent, such as carbon black or an ion conductive agent, is added, a method in which rubber is blended with a base layer or the like is adopted for the purpose of improving charging abilities.

CITATION LIST

Patent Literature

[Patent Literature 1]
Japanese Patent Laid-Open No. 2020-166259
In a charging roll, the addition of a large amount of a conductive agent, such as carbon black or an ion conductive agent, increases the amount of charge in the charging roll and increases the apparent amount of charge or discharge. However, since the flow of charge into a local uneven resistance part in the charging roll becomes large, excessive discharge is caused, and black spots are generated in images. In addition, the large flow of charge into local uneven resistance in the charging roll generates uneven discharge or uneven charge and generates a horizontal streak or unevenness in images.

An objective that the present disclosure intends to achieve is to provide a charging roll for an electrophotographic device with which attenuation of charge from the roll surface due to local uneven resistance is minimized and satisfactory images are obtained and a method for manufacturing the charging roll for an electrophotographic device.

SUMMARY

A charging roll for an electrophotographic device according to the present disclosure includes a shaft, an elastic layer formed on an outer peripheral surface of the shaft, and a top layer formed on an outer peripheral surface of the elastic layer, in which the elastic layer is constituted of a high-resistance first phase in which a surface resistance value is $1.6 \times 10^{14}$ $\Omega \cdot$cm or more and $8.8 \times 10^{15}$ $\Omega \cdot$cm or less and a low-resistance second phase in which a surface resistance value is $1.3 \times 10^2$ $\Omega \cdot$cm or more and $4.9 \times 10^3$ $\Omega \cdot$cm or less, and the second phase contains two types of carbon black: carbon black A, of which an amount of DBP absorption is 115 cm$^3$/100 g or more and 160 cm$^3$/100 g or less; and carbon black B, of which an amount of DBP absorption is 70 cm$^3$/100 g or more and 110 cm$^3$/100 g or less.

It is preferable that, in the elastic layer, the first phase constitute a sea phase and the second phase constitute an island phase. It is preferable that a content ratio of the carbon black A to the carbon black B in the second phase be 3.0 or more and 10.0 or less in terms of mass ratio. It is preferable that the carbon black A have a specific surface area of 25 m$^2$/g or more and 75 m$^2$/g or less and the carbon black B have a specific surface area of 140 m$^2$/g or more and 180 m$^2$/g or less. It is preferable that the carbon black A have an average particle diameter of 35 nm or more and 75 nm or less and the carbon black B have an average particle diameter of 20 nm or more and 30 nm or less. It is preferable that, relative to 100 parts by mass of a polymer component in the elastic layer, a content of the carbon black A be 5 parts by mass or more and 75 parts by mass or less and a content of the carbon black B be 1.5 parts by mass or more and 20 parts by mass or less. It is preferable that the first phase contain a non-polar polymer and the second phase contain a polar polymer. It is preferable that the non-polar polymer be isoprene rubber or natural rubber and the polar polymer be nitrile rubber or hydrin rubber. It is preferable that, in an arbitrary 5 μm×5 μm range of the elastic layer, an abundance ratio of the first phase to the second phase be 0.3 or more and 20 or less in terms of area ratio. It is preferable that the first phase be interposed between the second phase and the top layer.

In addition, a method for manufacturing a charging roll for an electrophotographic device according to the present disclosure is a method for manufacturing the above-described charging roll for an electrophotographic device, in which, with respect to a polymer component constituting the second phase, the two types of carbon black: the carbon black A and the carbon black B are kneaded together, and then a polymer component constituting the first phase is kneaded in.

BRIEF DESCRIPTION OF DRAWINGS (a) of FIG. 1 is a schematic external view of a charging roll for an electrophotographic device according to an embodiment of the present disclosure, and (b) of FIG. 1 is an A-A line cross-sectional view.

Figure 2:
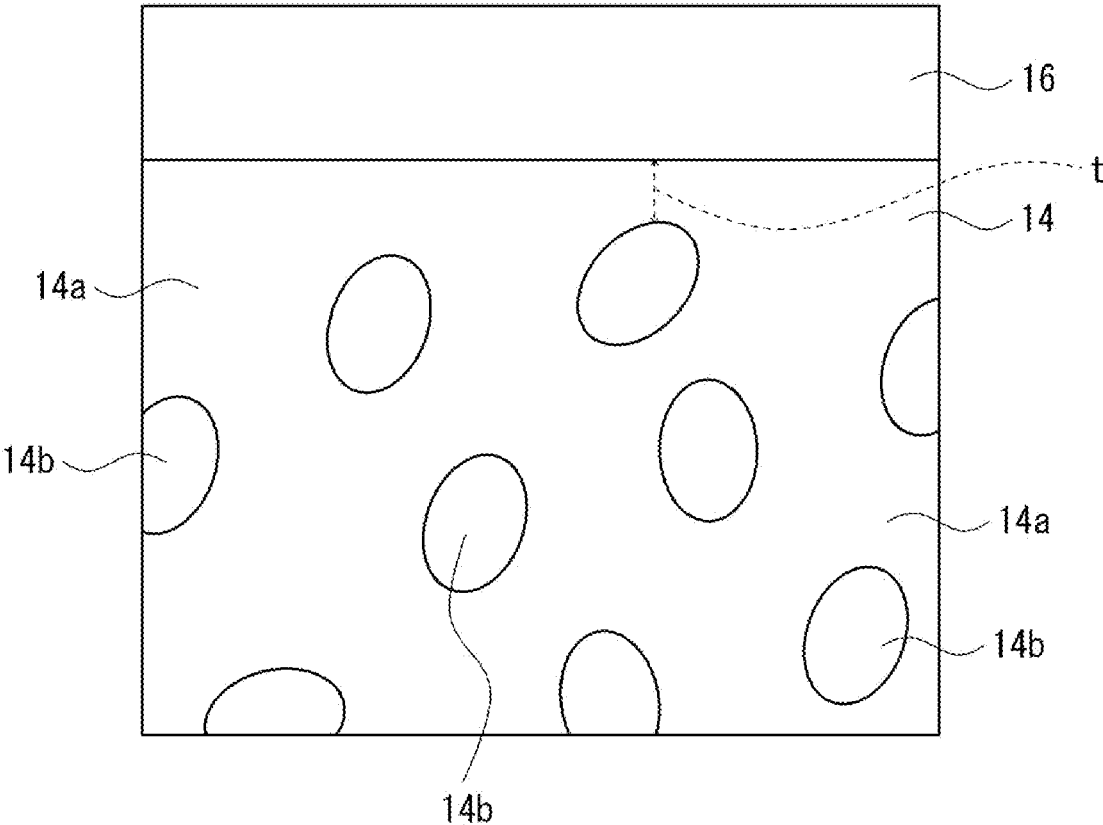

FIG. 2 is a pattern diagram showing phase constitution in an arbitrary 5 μm×5 μm range of an elastic layer near a top layer.

DESCRIPTION OF EMBODIMENTS

According to the charging roll for an electrophotographic device according to the present disclosure, since the charging roll includes a shaft, an elastic layer formed on the outer peripheral surface of the shaft, and a top layer formed on the outer peripheral surface of the elastic layer, the elastic layer is constituted of a high-resistance first phase in which the surface resistance value is $1.6 \times 10$ 14 $\Omega \cdot$cm or more and $8.8 \times 10^{15}$ $\Omega \cdot$cm or less and a low-resistance second phase in which the surface resistance value is $1.3 \times 10^2$ $\Omega \cdot$cm or more and $4.9 \times 10^3$ $\Omega \cdot$cm or less, and the second phase contains two types of carbon black: carbon black A, of which the amount of DBP absorption is 115 cm$^3$/100 g or more and 160 cm$^3$/100 g or less; and carbon black B, of which the amount of DBP absorption is 70 cm$^3$/100 g or more and 110 cm$^3$/100 g or less, attenuation of charge from the roll surface due to local uneven resistance is minimized, and satisfactory images are obtained.

In the elastic layer, when the first phase constitutes a sea phase and the second phase constitutes an island phase, a charge blocking effect of the first phase improves, and local uneven resistance is further absorbed. This further minimizes the attenuation of charge from the roll surface.

When the content ratio of the carbon black A to the carbon black B in the second phase is 3.0 or more and 10.0 or less in terms of mass ratio, the balance between the electrostatic capacity and resistance of the carbon black is excellent. This makes discharge uniformity excellent and further minimizes image unevenness.

When the carbon black A has a specific surface area of 25 m$^2$/g or more and 75 m$^2$/g or less, it is easy to maintain the electrostatic capacity within a preferable range. In addition, when the carbon black B has a specific surface area of 140 m$^2$/g or more and 180 m$^2$/g or less, the carbon black B has a low resistance, and it is easy to maintain the resistance within a preferable range.

When the carbon black A has an average particle diameter of 35 nm or more and 75 nm or less, it is easy to make the specific surface area of the carbon black A be within a preferable range and to make the carbon black A have a high resistance. In addition, when the carbon black B has an average particle diameter of 20 nm or more and 30 nm or less, it is easy to make the specific surface area of the carbon black B be within a preferable range and to make the carbon black B have a low resistance.

When the content of the carbon black A is 5 parts by mass or more and 75 parts by mass or less relative to 100 parts by mass of a polymer component in the elastic layer, it is easy to maintain the electrostatic capacity within a preferable range. In addition, when the content of the carbon black B is 1.5 parts by mass to 20 parts by mass or less relative to 100 parts by mass of the polymer component in the elastic layer, it is easy to maintain the resistance within a preferable range.

When the first phase contains a non-polar polymer and the second phase contains a polar polymer, phase separation of the first phase and the second phase becomes satisfactory, and it is easy to minimize attenuation of charge from the roll surface due to local uneven resistance. In addition, when the non-polar polymer is isoprene rubber or natural rubber and the polar polymer is nitrile rubber or hydrin rubber, phase separation of the first phase and the second phase becomes satisfactory, and it is easy to minimize attenuation of charge from the roll surface due to local uneven resistance.

When the abundance ratio (first phase/second phase) of the first phase to the second phase is 0.3 or more and 20 or less in terms of area ratio in an arbitrary 5 μm×5 μm range of the elastic layer, the first phase and the second phase are finely dispersed, and an effect of minimizing attenuation of charge from the roll surface due to local uneven resistance is excellent.

When the first phase is interposed between the second phase and the top layer, the charge blocking effect of the first phase improves, and local uneven resistance is further absorbed. This further minimizes the attenuation of charge from the roll surface.

In addition, according to the method for manufacturing a charging roll for an electrophotographic device according to the present disclosure, it is possible to provide a charging roll for an electrophotographic device with which attenuation of charge from the roll surface due to local uneven resistance is minimized and satisfactory images are obtained.

A charging roll for an electrophotographic device according to the present disclosure (hereinafter, simply referred to as the charging roll in some cases) will be described in detail. (a) of FIG. 1 is a schematic external view of a charging roll for an electrophotographic device according to an embodiment of the present disclosure, and (b) of FIG. 1 is an A-A line cross-sectional view. FIG. 2 is a pattern diagram showing phase constitution in an arbitrary 5 μm×5 μm range of an elastic layer near a top layer. A charging roll 10 includes a shaft 12, an elastic layer 14 formed on the outer peripheral surface of the shaft 12, and a top layer 16 formed on the outer peripheral surface of the elastic layer 14. The elastic layer 14 is a layer that serves as the base of the charging roll 10 (base layer). The top layer 16 is a layer that appears on the surface of the charging roll 10.

The shaft 12 is not particularly limited as long as the shaft is conductive. Specific examples thereof include a metal solid body made of iron, stainless steel, aluminum or the like, a cored bar made of a hollow body and the like. The shaft 12 may have an adhesive, a primer or the like applied onto the surface as necessary. That is, the elastic layer 14 may be caused to adhere to the shaft 12 through an adhesive layer (primer layer). The adhesive, the primer or the like may be made conductive as necessary.

The elastic layer 14 is constituted of a high-resistance first phase 14a in which the surface resistance value is 1.6×10$^{14}$ Ω·cm or more and 8.8×10$^{15}$ Ω·cm or less and a low-resistance second phase 14b in which the surface resistance value is 1.3×10$^2$ Ω·cm or more and 4.9×10$^3$ Ω·cm or less. As shown in FIG. 2, the first phase 14a and the second phase 14b are present separately from each other.

The first phase 14a contains one or more polymers. The polymer in the first phase 14a is preferably a non-polar polymer from the viewpoint of a high resistance. Examples of the polymer in the first phase 14a include isoprene rubber (IR), hydrogenated isoprene rubber, natural rubber (NR), butadiene rubber (BR), styrene-butadiene rubber (SBR), butyl rubber (IIR), ethylene-propylene rubber (EPM), ethylene propylene diene monomer rubber (EPDM), silicone rubber (Q) and the like. These may be singly used as the polymer in the first phase 14a or two or more thereof may be used in combination. Among these, isoprene rubber and natural rubber are preferable from the viewpoint of a high resistance and an excellent effect as a dielectric phase. The first phase 14a preferably contains no or only a small amount of a conductive agent such as carbon black from the viewpoint of high resistance. The content of the conductive agent in the first phase 14a is smaller than at least that in the second phase 14b.

The second phase 14b contains two or more types of carbon black. The carbon black in the second phase 14b is two types of carbon black: carbon black A, of which the amount of DBP absorption is 115 cm$^3$/100 g or more and 160 cm$^3$/100 g or less, and carbon black B, of which the amount of DBP absorption is 70 cm$^3$/100 g or more and 110 cm$^3$/100 g or less. The carbon black A having a large amount of DBP absorption stores charge as a dielectric body. The carbon black B having a small amount of DBP absorption helps charge rapidly flow. The use of the two types of carbon black having different amount of DBP absorption makes it possible to ensure an appropriate electrostatic capacity while maintaining a low resistance. The amount of DBP absorption of the carbon black is calculated from the amount of dibutyl phthalate (DBP) that is absorbed by 100 g of the carbon black according to JIS K 6221.

The amount of DBP absorption of the carbon black A is more preferably 120 cm³/100 g or more from the viewpoint of improving the electrostatic capacity. In addition, the amount of DBP absorption of the carbon black A is more preferably 150 cm³/100 g or less and still more preferably 140 cm³/100 g or less from the viewpoint of improving the discharging properties. Incidentally, the amount of DBP absorption of the carbon black B is more preferably 80 cm³/100 g or more from the viewpoint of improving the electrostatic capacity. In addition, the amount of DBP absorption of the carbon black B is more preferably 100 cm³/100 g or less and still more preferably 90 cm³/100 g or less from the viewpoint of improving the discharging properties.

The carbon black A having a large amount of DBP absorption preferably has a relatively high resistance from the viewpoint of an excellent function of storing charge as a dielectric body or the like. From this viewpoint, the carbon black A preferably has a relatively small specific surface area and has large particle diameters. Specifically, the specific surface area of the carbon black A is preferably 25 m²/g or more and 75 m²/g or less. In addition, the average particle diameter is preferably 35 nm or more and 75 nm or less. The specific surface area of the carbon black A is more preferably 30 m²/g or more and 70 m²/g or less and still more preferably 30 m²/g or more and 60 m²/g or less. The average particle diameter of the carbon black A is more preferably 40 nm or more and 70 nm or less and still more preferably 40 nm or more and 60 nm or less. When the average particle diameter of the carbon black A is 35 nm or more and 75 nm or less, it is easy to make the specific surface area of the carbon black A be within a preferable range and to make the carbon black A have a high resistance.

The carbon black B having a small amount of DBP absorption preferably has a relatively low resistance from the viewpoint of an excellent function of helping charge rapidly flow or the like. From this viewpoint, the carbon black B preferably has a relatively large specific surface area and has small particle diameters. Specifically, the specific surface area of the carbon black B is preferably 140 m²/g or more and 180 m²/g or less. In addition, the average particle diameter is preferably 20 nm or more and 30 nm or less. The specific surface area of the carbon black B is more preferably 150 m²/g or more and 180 m²/g or less and still more preferably 150 m²/g or more and 170 m²/g or less. The average particle diameter of the carbon black B is more preferably 20 nm or more and 25 nm or less. When the average particle diameter of the carbon black B is 20 nm or more and 30 nm or less, it is easy to make the specific surface area of the carbon black B be within a preferable range and to make the carbon black B have a low resistance.

The specific surface area of the carbon black is a value measured by the BET method. The average particle diameter of the carbon black is represented by an arithmetic average diameter obtained by observing the carbon black with an electronic microscope.

The second phase 14b contains one or more polymers. The polymer in the second phase 14b is preferably a polar polymer from the viewpoint of a low resistance. Examples of the polymer in the second phase 14b include nitrile rubber (NBR), hydrin rubber, urethane rubber (U), acrylic rubber (copolymer of acrylic acid ester and 2-chloroethyl vinyl ether, ACM), chloroprene rubber (CR) and the like. Examples of the hydrin rubber include poly (epichlorohydrin) homopolymer (CO), poly (epichlorohydrin-co-ethylene oxide) copolymer (ECO), poly (epichlorohydrin-co-allyl glycidyl ether) copolymer (GCO), poly (epichlorohydrin-co-ethylene oxide-co-allyl glycidyl ether) copolymer (GECO) and the like. These may be singly used as the polymer in the second phase 14b or two or more thereof may be used in combination. Among these, nitrile rubber (NBR) and hydrin rubber are preferable from the viewpoint of a lower resistance or the like.

When the first phase 14a contains the non-polar polymer and the second phase 14b contains the polar polymer, phase separation of the first phase 14a and the second phase 14b becomes satisfactory, and it is easy to minimize attenuation of charge from the roll surface due to local uneven resistance. The polymer in the first phase 14a preferably has a higher resistance than the polymer in the second phase 14b. A preferable combination of the polymer in the first phase 14a and the polymer in the second phase 14b is a combination of isoprene rubber (IR) and nitrile rubber (NBR) or a combination of natural rubber (NR) and nitrile rubber (NBR).

The surface resistance value of the first phase 14a can be adjusted to be within a desired range with the polymer type, vulcanization conditions or the like. The surface resistance value of the second phase 14b can be adjusted to be within a desired range with the polymer type, vulcanization conditions, the amount of the carbon black A and the carbon black B added or the like.

The content ratio (A/B) of the carbon black A to the carbon black B in the second phase 14b is preferably 3.0 or more and 10.0 or less in terms of mass ratio from the viewpoint of an excellent balance between the electrostatic capacity and resistance of the carbon black. A/B is more preferably 3.0 or more and 7.0 or less and still more preferably 4.0 or more and 7.0 or less.

The content of the carbon black A is preferably 5 parts by mass or more relative to 100 parts by mass of the polymer component in the elastic layer 14 from the viewpoint of easily ensuring the electrostatic capacity or the like. The content is more preferably parts by mass or more and still more preferably 20 parts by mass or more. In addition, the content of the carbon black A is preferably 75 parts by mass or less relative to 100 parts by mass of the polymer component in the elastic layer 14 from the viewpoint of easily minimizing deficient discharge or the like. The content is more preferably 70 parts by mass or less and still more preferably 60 parts by mass or less. In addition, when the content of the carbon black A is 5 parts by mass or more and 75 parts by mass or less relative to 100 parts by mass of the polymer component in the elastic layer 14, it is easy to maintain the electrostatic capacity within a preferable range.

The content of the carbon black B is preferably 1.5 parts by mass or more relative to 100 parts by mass of the polymer component in the elastic layer 14 from the viewpoint of easily ensuring a low resistance or the like. The content is more preferably 3.0 parts by mass or more and still more preferably 5.0 parts by mass or more. In addition, the content of the carbon black B is preferably 20 parts by mass or less relative to 100 parts by mass of the polymer component in the elastic layer 14 from the viewpoint of easily minimizing excessive discharge or the like. The content is more preferably 15 parts by mass or less. In addition, when the content of the carbon black B is 1.5 parts by mass or more and 20 parts by mass or less relative to 100 parts by mass of the polymer component in the elastic layer 14, it is easy to maintain the resistance within a preferable range.

As shown in FIG. 2, in the elastic layer 14, the first phase 14a constitutes a sea phase and the second phase 14b constitutes island phases. This makes the charge blocking effect of the first phase 14a improve, makes local uneven resistance further absorbed and makes attenuation of charge from the roll surface further minimized. The sea-island structure of the elastic layer 14 can be formed by adjusting the abundance ratio of the first phase 14a and the second phase 14b, adjusting the content ratio of the carbon black A to the carbon black B or adjusting a method for kneading the first phase 14a and the second phase 14b. The sea phase can be referred to as a matrix phase, a continuous phase or the like. The island phases can be referred to as domain phases, disperse phases or the like. The second phase 14b is expressed as phases that scatter in island phases in the sea of the first phase 14a.

When the first phase 14a constitutes a sea phase and the second phase 14b constitutes island phases in the elastic layer 14, basically, the second phase 14b becomes a phase that does not appear in the interface with the top layer 16. As described above, the second phase 14b is preferably a phase that is not in contact with the top layer 16. That is, as shown in FIG. 2, the first phase 14a is preferably interposed between the second phase 14b and the top layer 16. When the first phase 14a is interposed between the second phase 14b and the top layer 16, the charge blocking effect of the first phase 14a improves, and local uneven resistance is further absorbed. This further minimizes the attenuation of charge from the roll surface. The thickness t of the first phase 14a interposed between the second phase 14b and the top layer 16 is preferably 10 nm or more from the viewpoint of an excellent charge blocking effect of the first phase 14a. The thickness is more preferably 50 nm or more and still more preferably 100 nm or more. In addition, the thickness t of the first phase 14a interposed between the second phase 14b and the top layer 16 is preferably 2.0 nm or less from the viewpoint of easiness in discharge or the like. The thickness is more preferably 1.5 μm or less and still more preferably 1.0 μm or less. The thickness t of the first phase 14a interposed between the second phase 14b and the top layer 16 can be obtained by observation with an electronic microscope.

The first phase 14a preferably has a higher resistance than the top layer 16 from the viewpoint of exhibiting the charge blocking effect of the first phase 14a or the like. That is, the first phase 14a preferably has a higher resistance than the second phase 14b and has a higher resistance than the top layer 16. In addition, the second phase 14b preferably has a lower resistance than the top layer 16 or has the same resistance as the top layer 16 from the viewpoint of easiness in discharge or the like. In this case, the resistance refers to the surface resistance.

In the elastic layer 14, the first phase 14a and the second phase 14b are preferably fined dispersed from each other. Specifically, in an arbitrary 5 μm×5 μm range of the elastic layer 14, the abundance ratio (first phase 14a/second phase 14b) of the first phase 14a to the second phase 14b is preferably 0.3 or more and 20 or less in terms of area ratio. The area ratio is more preferably 0.5 or more and 10 or less and still more preferably 1.0 or more and 5.0 or less. When the first phase 14a and the second phase 14b are fined dispersed from each other, an effect of minimizing attenuation of charge from the roll surface due to local uneven resistance is excellent. The dispersed structure of the elastic layer 14 can be formed by adjusting the abundance ratio of the first phase 14a and the second phase 14b, adjusting the content ratio of the carbon black A to the carbon black B or adjusting a method for kneading the first phase 14a and the second phase 14b. The dispersed structure of the elastic layer 14 can be obtained by observation with an electronic microscope.

To the elastic layer 14, a variety of additives may be added as appropriate as necessary. Examples of the additives include a lubricant, a vulcanization accelerator, an anti-aging agent, a light stabilizer, a viscosity modifier, a processing aid, a flame retardant, a plasticizer, a foaming agent, a filler, a dispersant, an anti-foaming agent, a pigment, a release agent and the like.

The thickness of the elastic layer 14 is not particularly limited and may be selected as appropriate within a range of 0.1 to 10 mm or the like depending on use or the like.

A main material that forms the top layer 16 is not particularly limited, and examples thereof include polyamide (nylon)-based, acrylic, urethane-based, silicone-based and fluorine-based polymers. These polymers may be modified polymers. Examples of a modifying group include a N-methoxymethyl group, a silicone group, a fluorine group and the like.

The top layer 16 may contain roughness-forming particles. The roughness-forming particles are particles for imparting roughness to the surface of the top layer 16. That is, the roughness-forming particles are particles for imparting unevenness to the surface of the top layer 16. The surface unevenness of the top layer 16 increases discharge spaces between a photoreceptor and the charging roll 10 and promotes discharge. This improves the charging properties and makes it possible to minimize an image defect such as a horizontal streak or unevenness.

As the roughness-forming particles, resin particles or the like are used. A material of the roughness-forming particles is not particularly limited. The roughness-forming particles are preferably constituted of a polymer having a carbonyl group. This is because the polymer having a carbonyl group is a material having a relatively high permittivity and makes it easy for the charging roll 10 to ensure the charging properties. Examples of the polymer having a carbonyl group include a urethane resin, a polyamide resin, an acrylic resin, an acrylic silicone resin, a silicone grafted acrylic polymer, an acrylic grafted silicone polymer, urethane rubber and the like.

The sizes of the roughness-forming particles are not particularly limited, but the average particle diameter thereof is preferably 3.0 μm or more and 50 μm or less from the viewpoint of easily ensuring uniform charging properties. More preferably, the average particle diameter thereof is preferably 5.0 μm or more and 30 μm or less. The average particle diameter of the roughness-forming particles is represented by the average of the particle diameters of arbitrary 20 particles obtained from the diameters of the roughness-forming particles visible at the time of observing the surface of the top layer 16 with a laser microscope.

The content of the roughness-forming particles in the top layer 16 is not particularly limited, but is preferably 3 parts by mass or more and 50 parts by mass or less relative to 100 parts by mass of a binder polymer in the top layer 16 from the viewpoint of easily ensuring uniform charging properties or the like. The content is more preferably 5 parts by mass or more and 30 parts by mass or less.

To the top layer 16, it is possible to add a conventionally well-known conductive agent, such as carbon black, graphite, conductive titanium oxide, conductive zinc oxide, conductive tin oxide or an ion conductive agent (a quaternary ammonium salt, a borate, a surfactant or the like), as appropriate in order to impart conductive properties. In addition, a variety of additives may be added as appropriate as necessary.

The volume resistivity of the top layer 16 is preferably set within a semiconducting region from the viewpoint of charging properties or the like. Specifically, the volume resistivity is preferably set within a range of $1.0 \times 10^7$ to $1.0 \times 10^{10}$ $\Omega \cdot cm$. The volume resistivity can be measured according to JIS K 6911. The thickness of the top layer 16 is not particularly limited, but is preferably set within a range of 0.1 to 3.0 or the like. The thickness of the top layer 16 can be measured by observing the cross section using a laser microscope (for example, "VK-9510" manufactured by Keyence Corporation or the like). For example, the thickness can be represented by the average of the distances from the surface of the elastic layer 14 to the surface of the top layer 16 measured at five arbitrary positions, respectively.

The charging roll 10 can be produced by forming the elastic layer 14 on the outer peripheral surface of the shaft and forming the top layer 16 on the outer peripheral surface of the elastic layer 14.

The elastic layer 14 can be formed, for example, as described below. First, the shaft is coaxially installed in a hollow part of a roll forming die, and a non-crosslinked composition for forming the elastic layer is injected thereinto, heated and cured (crosslinked) and then released from the die or a non-crosslinked composition for forming the elastic layer is extruded onto the surface of the shaft or the like, thereby forming the elastic layer 14 on the outer periphery of the shaft.

The composition for forming the elastic layer can be formed by kneading the two types of carbon black: the carbon black A and the carbon black B with respect to a polymer component constituting the second phase 14b and then kneading a polymer component constituting the first phase 14a.

A composition for forming the top layer is used to form the top layer 16. The composition for forming the top layer contains the main material, the conductive agent and other additives that are contained as necessary.

The composition for forming the top layer may contain a solvent such as an organic solvent, such as methyl ethyl ketone, toluene, acetone, ethyl acetate, butyl acetate, methyl isobutyl ketone (MIBK), THF or DMF, and a water-soluble solvent, such as methanol or ethanol, as appropriate from the viewpoint of adjusting the viscosity or the like.

The top layer 16 can be formed by a method in which the composition for forming the top layer is applied onto the outer peripheral surface of the elastic layer 14 or the like. As an application method, it is possible to apply a variety of coating methods such as a roll coating method, a dipping method and a spray coating method. On the coated top layer 16, ultraviolet irradiation or a heat treatment may be performed as necessary.

According to the charging roll 10 having the above-described constitution, in the elastic layer 14, the carbon black B having a small amount of DBP absorption is present in the low-resistance second phase 14b, whereby charge rapidly flows, and a low resistance can be ensured. In addition, the carbon black A having a large amount of DBP absorption, which is present in the low-resistance second phase 14b together with this carbon black B, exhibits a function of storing charge as a dielectric body, and the high-resistance first phase 14a, which is present separately from the low-resistance second phase 14b, turns into a dielectric phase to block and uniform charge, whereby local uneven resistance is absorbed. Therefore, attenuation of charge from the roll surface due to local uneven resistance is minimized, and satisfactory images are obtained.

EXAMPLES

Hereinafter, the present disclosure will be described in detail using examples and comparative examples.

Example 1

<Preparation of Composition for Forming Elastic Layer>

50 Parts by mass of carbon black A-1 and 10 parts by mass of carbon black B-1 were blended with 40 parts by mass of NBR, and these were stirred and mixed together with a stirrer, thereby preparing a composition for forming a second phase. Next, 60 parts by mass of isoprene rubber, 5 parts by mass of a peroxide crosslinking agent, 3 parts by mass of a vulcanization aid and 3 parts by mass of a catalyst were blended with the composition for forming a second phase, and these were stirred and mixed together with the stirrer, thereby preparing a composition for forming an elastic layer.

<Production of Elastic Layer>

A cored bar (diameter: 8 mm) was set in a (pipe-like) forming die, and the composition for forming an elastic layer was injected thereinto, heated at 180° C. for 30 minutes, then, cooled and released from the die, thereby forming an elastic layer having a thickness of 1.9 mm on the outer periphery of the cored bar.

<Preparation of Composition for Forming Top Layer>

Roughness-forming particles and a binder polymer were blended together, 200 parts by mass of methyl ethyl ketone (MEK) was added thereto, and these are mixed together and stirred at a predetermined stirring rate, thereby preparing a composition for forming a top layer.

Binder polymer (PU): "ART Resin UN-333" manufactured by Negami Chemical Industrial Co., Ltd.

Roughness-forming particles (PU): "ART PEARL C-600 transparent" manufactured by Negami Chemical Industrial Co., Ltd., average particle diameter: 10 μm <Production of Top Layer>

The composition for forming a top layer was applied onto the outer peripheral surface of the elastic layer by roll coating while being continuously stirred, and a heat treatment was performed thereon, thereby forming a top layer having a thickness of 1.0 μm on the outer periphery of the elastic layer. Therefore, a charging roll of Example 1 was produced.

Example 2

A charging roll was produced in the same manner as in Example 1 except that, in the preparation of the composition for forming an elastic layer, the amounts of the carbon black A and the carbon black B blended in were changed.

Example 3

A charging roll was produced in the same manner as in Example 1 except that, in the preparation of the composition for forming an elastic layer, the blend ratio between IR and NBR was changed and the type of the carbon black A was changed.

Examples 4 to 5

Charging rolls were produced in the same manner as in Example 1 except that, in the preparation of the composition for forming an elastic layer, the type of the carbon black A was changed.

Example 6

A charging roll was produced in the same manner as in Example 1 except that, in the preparation of the composition for forming an elastic layer, the type of the carbon black B was changed and the amounts of the carbon black A and the carbon black B blended were changed.

Example 7

A charging roll was produced in the same manner as in Example 1 except that, in the preparation of the composition for forming an elastic layer, the blend ratio between IR and NBR was changed and the amount of the carbon black B blended was changed.

Examples 8 to 11

Charging rolls were produced in the same manner as in Example 1 except that, in the preparation of the composition for forming an elastic layer, the amounts of the carbon black A and the carbon black B blended were changed.

Examples 12 and 13

Charging rolls were produced in the same manner as in Example 1 except that, in the preparation of the composition for forming an elastic layer, the blend ratio between IR and NBR was changed.

Comparative Examples 1 to 5

Charging rolls were produced in the same manner as in Example 1 except that, in the preparation of the composition for forming an elastic layer, the types of the carbon black was changed.

Comparative Examples 6 and 7

Charging rolls were produced in the same manner as in Example 1 except that, in the preparation of the composition for forming an elastic layer, the vulcanization conditions of IR and NBR were changed. Compared with Example 1, the vulcanization temperature was raised, and the vulcanization time was shortened in Comparative Example 6. In addition, compared with Example 1, the vulcanization temperature was lowered, and the vulcanization time was extended in Comparative Example 7.

Comparative Examples 8 and 9

Charging rolls were produced in the same manner as in Example 1 except that, in the preparation of the composition for forming an elastic layer, the amount of the carbon black B blended was changed.

Comparative Example 10

A charging roll was produced in the same manner as in Example 1 except that, in the preparation of the composition for forming an elastic layer, 50 parts by mass of the carbon black A-1, 10 parts by mass of the carbon black B-1, 5 parts by mass of an oxide crosslinking agent, 3 parts by mass of the vulcanization aid and 3 parts by mass of the catalyst were blended with 100 parts by mass of isoprene rubber, and these were stirred and mixed together with the stirrer. Therefore, the elastic layer is constituted of only one phase containing isoprene rubber.

Comparative Example 11

A charging roll was produced in the same manner as in Example 1 except that, in the preparation of the composition for forming an elastic layer, 50 parts by mass of the carbon black A-1, 10 parts by mass of the carbon black B-1, 5 parts by mass of an oxide crosslinking agent, 3 parts by mass of the vulcanization aid and 3 parts by mass of the catalyst were blended with 100 parts by mass of NBR, and these were stirred and mixed together with the stirrer. Therefore, the elastic layer is constituted of only one phase containing NBR.

As the materials of the compositions for forming an elastic layer, the following materials were prepared.

(Base Polymers)

Isoprene rubber (IR): "Nipol IR2200" manufactured by ZEON Corporation

Nitrile rubber (NBR): "Nipol 1041" manufactured by ZEON Corporation (Carbon Black A)

A-1 (amount of DBP absorption: 124 ml/100 g, BET specific surface area: 43 $m^2$/g, average particle diameter: 41 nm): "ASAHI #60H (N-568)" manufactured by Asahi Carbon Co., Ltd.

A-2 (amount of DBP absorption: 160 ml/100 g, BET specific surface area: 75 $m^2$/g, average particle diameter: 35 nm): "DENKA BLACK" manufactured by Denka Company Limited.

A-3 (amount of DBP absorption: 115 ml/100 g, BET specific surface area: 42 $m^2$/g, average particle diameter: 44 nm): "SEAST SO" manufactured by Tokai Carbon Co., Ltd.

A-4 (amount of DBP absorption: 155 ml/100 g, BET specific surface area: 25 $m^2$/g, average particle diameter: 75 nm): "SEAST GFY" manufactured by Tokai Carbon Co., Ltd.

A-5 (amount of DBP absorption: 125 ml/100 g, BET specific surface area: 126 $m^2$/g, average particle diameter: 20 nm): "SEAST 7HM" manufactured by Tokai Carbon Co., Ltd.

(Carbon Black B)

B-1 (amount of DBP absorption: 70 ml/100 g, BET specific surface area: 180 $m^2$/g, average particle diameter: 25 nm): "Special Black4" manufactured by Orion Engineered Carbons B-2 (amount of DBP absorption: 110 ml/100 g, BET specific surface area: 140 $m^2$/g, average particle diameter: 20 nm): "SHOW BLACK IP1500" manufactured by Showa Carbot K.K.

B-3 (amount of DBP absorption: 110 ml/100 g, BET specific surface area: 20 $m^2$/g, average particle diameter: 85 nm): "ASAHI #50H" manufactured by Asahi Carbon Co., Ltd.

(Other Carbon Black)

X-1 (amount of DBP absorption: 175 ml/100 g, BET specific surface area: 165 $m^2$/g, average particle diameter: 21 nm): "#3400B" manufactured by Mitsubishi Chemical Corporation X-2 (amount of DBP absorption: 58 ml/100 g, BET specific surface area: 180 m²/g, average particle diameter: 18 nm): "#1000" manufactured by Mitsubishi Chemical Corporation X-3 (amount of DBP absorption: 360 ml/100 g, BET specific surface area: 800 m²/g, average particle diameter: 32 nm): "KETJEN EC300J" manufactured by Ketjen Black International Co.

For the produced charging rolls, the surface resistance values of the first phase and the second phase were measured. In addition, the area ratio of the first phase to the second phase was measured. Furthermore, the following image evaluation was performed.

(Measurement of Surface Resistance Value)

A cross section of the produced charging roll was scanned 1 μm with a scanning probe microscope "AFM5100N" manufactured by Hitachi High-Tech Corporation in a DFM mode using a cantilever "SI-DF3", and the surface resistance (Ω·cm) of each of the first phase and the second phase was derived.

(Measurement of Area Ratio)

An arbitrary 5 μm×5 μm range of a cross section of the produced charging roll was observed with a scanning electron microscope "JSM-7200F" manufactured by JEOL Ltd. at a magnification of 1,000,000 times, and the area ratio of the first phase to the second phase was calculated.

(Uneven(Mura) Image)

The produced charging rolls was combined into a multi-function printer "bizhub C658" manufactured by Konica Minolta Japan, Inc. as a conductive roll, 550,000 sheets were printed in a border mode with a print density of 1% under a 10° C.×10% RH environment, and then a half tone image with a print density of 25% was printed. In a case where no uneven images were confirmed, images were evaluated as satisfactory "0", and, in a case where an uneven image was confirmed, images were evaluated as poor "X."

(Horizontal Streak Image)

The produced charging rolls was combined into a multi-function printer "bizhub C658" manufactured by Konica Minolta Japan, Inc. as a conductive roll, 550,000 sheets were printed in a border mode with a print density of 1% under a 10° C.×10% RH environment, and then a half tone image with a print density of 25% was printed. In a case where no horizontal streaks were confirmed, images were evaluated as satisfactory "0", and, in a case where a horizontal streak was confirmed, images were evaluated as poor "X."

(Black Spot Image)

The produced charging rolls was combined into a multi-function printer "bizhub C658" manufactured by Konica Minolta Japan, Inc. as a conductive roll, 550,000 sheets were printed in a border mode with a print density of 1% under a 10° C.×10% RH environment, and then a half tone image with a print density of 25% was printed. In a case where no black spots were confirmed in images, the images were evaluated as satisfactory "0", and, in a case where a black spot was confirmed in images, the images were evaluated as poor "X."

TABLE 1

| | | | Amount of DBP absorption ml/100 g | Specific surface area m²/g | Particle diameter nm | Example 1 | 2 | 3 | 4 | 5 | 6 | 7 | 8 | 9 | 10 | 11 | 12 | 13 |
|---|---|---|---|---|---|---|---|---|---|---|---|---|---|---|---|---|---|---|
| Blending proportion | IR (base polymer of first phase) | | | | | 60 | 60 | 20 | 60 | 60 | 60 | 95 | 60 | 60 | 60 | 60 | 97 | 10 |
| | NBR (base polymer of second phase) | | | | | 40 | 40 | 80 | 40 | 40 | 40 | 5 | 40 | 40 | 40 | 40 | 3 | 90 |
| | Carbon black | A-1 | 124 | 43 | 41 | 50 | 75 | — | — | — | 5 | 50 | 80 | 3 | 70 | 10 | 50 | 50 |
| | | A-2 | 160 | 75 | 35 | — | — | 50 | — | — | — | — | — | — | — | — | — | — |
| | | A-3 | 115 | 42 | 44 | — | — | — | 50 | — | — | — | — | — | — | — | — | — |
| | | A-4 | 155 | 25 | 75 | — | — | — | — | 50 | — | — | — | — | — | — | — | — |
| | | A-5 | 125 | 126 | 25 | — | — | — | — | — | — | — | — | — | — | — | — | — |
| | | B-1 | 70 | 180 | 20 | 10 | 20 | 10 | 10 | 10 | — | 5 | 5 | 20 | 3 | 10 | 10 | 10 |
| | | B-2 | 110 | 140 | 85 | — | — | — | — | — | 1.5 | — | — | — | — | — | — | — |
| | | B-3 | 110 | 20 | 21 | — | — | — | — | — | — | — | — | — | — | — | — | — |
| | | X-1 | 175 | 165 | 20 | — | — | — | — | — | — | — | — | — | — | — | — | — |
| | | X-2 | 58 | 180 | 18 | — | — | — | — | — | — | — | — | — | — | — | — | — |
| | | X-3 | 360 | 800 | 32 | — | — | — | — | — | — | — | — | — | — | — | — | — |
| Abundance ratio of first phase to second phase (first phase/second phase) | | | | | | 1.5 | 1.5 | 0.3 | 1.5 | 1.5 | 1.5 | 19.0 | 1.5 | 1.5 | 1.5 | 1.5 | 32.0 | 0.1 |
| Ratio between amounts of carbon black A and B added (A/B) | | | | | | 5.0 | 3.8 | 5.0 | 5.0 | 5.0 | 3.3 | 10.0 | 16.0 | 0.2 | 23.3 | 1.0 | 5.0 | 5.0 |
| Surface resistance value of first phase (×10¹⁴ Ω·cm) | | | | | | 1.6 | 5.0 | 88 | 10 | 8.0 | 11 | 9.0 | 6.0 | 10 | 40 | 6.0 | 80 | 70 |
| Surface resistance value of second phase (×10² Ω·cm) | | | | | | 1.8 | 1.3 | 5.8 | 2.0 | 16 | 49 | 23 | 2.0 | 1.5 | 4.7 | 12 | 22 | 19 |
| Image evaluation | Unevenness after endurance | | | | | O | O | O | O | O | O | O | O | O | O | O | O | O |
| | Horizontal streak after endurance | | | | | O | O | O | O | O | O | O | O | O | O | O | O | O |
| | Black spot after endurance | | | | | O | O | O | O | O | O | O | O | O | O | O | O | O |

TABLE 2

| | | Amount of DBP absorption | Specific surface area | Particle diameter | Comparative Example | | | | | | | | | | |
|---|---|---|---|---|---|---|---|---|---|---|---|---|---|---|---|
| | | ml/100 g | m²/g | nm | 1 | 2 | 3 | 4 | 5 | 6 | 7 | 8 | 9 | 10 | 11 |
| Blending proportion | IR (base polymer of first phase) | | | | 60 | 60 | 60 | 60 | 60 | 60 | 60 | 60 | 60 | 100 | — |
| | NBR (base polymer of second phase) | | | | 40 | 40 | 40 | 40 | 40 | 40 | 40 | 40 | 40 | — | 100 |
| Carbon black | A-1 | 124 | 43 | 41 | — | — | 50 | 50 | 10 | 50 | 50 | 50 | 50 | 50 | 50 |
| | A-2 | 160 | 75 | 35 | — | — | — | — | — | — | — | — | — | — | — |
| | A-3 | 115 | 42 | 44 | — | — | — | — | — | — | — | — | — | — | — |
| | A-4 | 155 | 25 | 75 | — | — | — | — | — | — | — | — | — | — | — |
| | A-5 | 125 | 126 | 25 | — | — | 10 | — | — | — | — | — | — | — | — |
| | B-1 | 70 | 180 | 20 | 10 | 10 | — | — | — | 10 | 10 | 25 | 1.0 | 10.0 | 10.0 |
| | B-2 | 110 | 140 | 85 | — | — | — | — | — | — | — | — | — | — | — |
| | B-3 | 110 | 20 | 21 | 50 | — | — | — | — | — | — | — | — | — | — |
| | X-1 | 175 | 165 | 20 | — | 50 | — | — | — | — | — | — | — | — | — |
| | X-2 | 58 | 180 | 18 | — | — | — | 10 | — | — | — | — | — | — | — |
| | X-3 | 360 | 800 | 32 | — | — | — | — | 2 | — | — | — | — | — | — |
| Abundance ratio of first phase to second phase (first phase/second phase) | | | | | 1.5 | 1.5 | 1.5 | 1.5 | 1.5 | 1.5 | 1.5 | 1.5 | 1.5 | — | — |
| Ratio between amounts of carbon black A and B added (A/B) | | | | | 5.0 | 5.0 | 5.0 | 5.0 | 5.0 | 5.0 | 5.0 | 2.0 | 50.0 | 5.0 | 5.0 |
| Surface resistance value of first phase (×10¹⁴ Ω · cm) | | | | | 1.9 | 11 | 24 | 10 | 17 | 92 | 1.1 | 10 | 31 | *1 | — |
| Surface resistance value of second phase (×10² Ω · cm) | | | | | 6.8 | 3.2 | 14 | 3.8 | 4.4 | 8.0 | 10 | 1.1 | 51 | — | 1.8 |
| Image evaluation | Unevenness after endurance | | | | O | O | O | O | O | O | O | O | O | O | O |
| | Horizontal streak after endurance | | | | X | X | X | X | O | X | O | O | X | X | X |
| | Black spot after endurance | | | | O | O | O | O | X | O | X | X | O | O | O |

*1 $9.5 \times 10^2$ Ω · cm

In Comparative Example 1, the elastic layer is constituted of two phases: the first phase containing IR and the second phase containing NBR, but the second phase does not contain the carbon black A, of which the amount of DBP absorption is 115 cm³/100 g or more and 160 cm³/100 g or less, but contains only the carbon black B, of which the amount of DBP absorption is 70 cm³/100 g or more and 110 cm³/100 g or less. Therefore, the electrostatic capacity is not sufficient to cause deficient charging, and a horizontal streak is generated in the image evaluation. In Comparative Example 2, the elastic layer is constituted of two phases: the first phase containing IR and the second phase containing NBR, but the second phase does not contain the carbon black A but contains the carbon black B and carbon black, of which the amount of DBP absorption is more than 160 cm³/100 g. Therefore, the electrostatic capacity is too large to cause deficient discharging, and charging becomes insufficient to generate a horizontal streak in the image evaluation.

In Comparative Example 3, the elastic layer is constituted of two phases: the first phase containing IR and the second phase containing NBR, but the second phase does not contain the carbon black B but contains only the carbon black A. Therefore, the dielectric properties are excessively prioritized to cause deficient discharging, and charging becomes insufficient to generate a horizontal streak in the image evaluation. In Comparative Example 4, the elastic layer is constituted of two phases: the first phase containing IR and the second phase containing NBR, but the second phase does not contain the carbon black B but contains the carbon black A and carbon black, of which the amount of DBP absorption is less than 70 cm³/100 g. Therefore, the electrostatic capacity is not sufficient to cause deficient charging, and a horizontal streak is generated in the image evaluation.

In Comparative Example 5, the elastic layer is constituted of two phases: the first phase containing IR and the second phase containing NBR, but the second phase does not contain the carbon black B but contains the carbon black A and carbon black, of which the amount of DBP absorption is more than 160 cm³/100 g. Since this carbon black, of which the amount of DBP absorption is more than 160 cm³/100 g, has a high specific surface area of 800 m²/g, charge excessively flows to cause excessive discharging (abnormal discharging), and a black spot is generated in the image evaluation.

In Comparative Example 6, the elastic layer is constituted of two phases: the first phase containing IR and the second phase containing NBR, but the surface resistance value of the first phase is too high, and thus the dielectric properties are excessively prioritized to cause deficient discharging, and charging becomes insufficient to generate a horizontal streak in the image evaluation. In Comparative Example 7, the elastic layer is constituted of two phases: the first phase containing IR and the second phase containing NBR, but the surface resistance value of the first phase is too low, and thus charge excessively flows to cause excessive discharging (abnormal discharging), and a black spot is generated in the image evaluation.

In Comparative Example 8, the elastic layer is constituted of two phases: the first phase containing IR and the second phase containing NBR, but the surface resistance value of the second phase is too low, and thus charge excessively flows to cause excessive discharging (abnormal discharging), and a black spot is generated in the image evaluation. In Comparative Example 9, the elastic layer is constituted of two phases: the first phase containing IR and the second phase containing NBR, but the surface resistance value of the second phase is too high, and thus the resistance is not sufficient to cause deficient charging, and a horizontal streak is generated in the image evaluation.

In Comparative Example 10, the elastic layer is not constituted of two phases: the first phase containing IR and the second phase containing NBR, but constituted of only one phase containing IR, and two types of the carbon black A and B are contained in the phase containing IR. In addition, in Comparative Example 11, the elastic layer is not constituted of two phases: the first phase containing IR and the second phase containing NBR, but constituted of only one phase containing NBR, and two types of the carbon black A and B are contained in the phase containing NBR. Therefore, in Comparative Examples 10 and 11, no phases that turn into a dielectric phase are present, the electrostatic capacity is not sufficient to cause deficient charging, and a horizontal streak is generated in the image evaluation.

In contrast, in the examples, the elastic layer is constituted of a high-resistance first phase in which a surface resistance value is $1.6 \times 10^{14}$ Ω·cm or more and $8.8 \times 10^{15}$ Ω·cm or less and a low-resistance second phase in which a surface resistance value is $1.3 \times 10^2$ Ω·cm or more and $4.9 \times 10^3$ Ω·cm or less, and the second phase contains two types of carbon black: carbon black A, of which an amount of DBP absorption is 115 cm$^3$/100 g or more and 160 cm$^3$/100 g or less; and carbon black B, of which an amount of DBP absorption is 70 cm$^3$/100 g or more and 110 cm$^3$/100 g or less. Therefore, attenuation of charge from the roll surface due to local uneven resistance is minimized, and satisfactory images are obtained. Even when the elastic layer contains the high-resistance first phase, but only contains the carbon black B having a small amount of DBP absorption as shown in Comparative Example 1, the electrostatic capacity is not sufficient to cause deficient charging, and charging is not sufficient. In addition, even when the elastic layer contains the low-resistance second phase, but only contains the carbon black A having a large amount of DBP absorption as shown in Comparative Example 3, the dielectric properties are excessively prioritized to cause deficient discharging, and discharging is not sufficient. In addition, even when the elastic layer contains two types of the carbon black A and B, but only one phase contains the two types of the carbon black A and B as shown in Comparative Examples 10 and 11, the electrostatic capacity is not sufficient to cause deficient charging, and charging is not sufficient. As in the examples, when the elastic layer contains the high-resistance first phase and the low-resistance second phase, and the carbon black A having a large amount of DBP absorption and the carbon black B having a small amount of DBP absorption are collectively contained in the second phase, attenuation of charge from the roll surface due to local uneven resistance is minimized, and satisfactory images are obtained.

Hitherto, the embodiment and examples of the present disclosure have been described, but the present disclosure is not limited to the above-described embodiment and examples by any means and can be modified in a variety of manners within the scope of the gist of the present disclosure.

The invention claimed is:

1. A charging roll for an electrophotographic device comprising:

a shaft;

an elastic layer formed on an outer peripheral surface of the shaft; and a top layer formed on an outer peripheral surface of the elastic layer, wherein the elastic layer is constituted of a high-resistance first phase in which a surface resistance value is $1.6 \times 10^{14}$ Ω·cm or more and $8.8 \times 10^{15}$ Ω·cm or less and a low-resistance second phase in which a surface resistance value is $1.3 \times 10^2$ Ω·cm or more and $4.9 \times 10^3$ Ω·cm or less, and the second phase contains two types of carbon black: carbon black A, of which an amount of dibutyl phthalate (DBP) absorption is 115 cm$^3$/100 g or more and 160 cm$^3$/100 g or less; and carbon black B, of which an amount of DBP absorption is 70 cm$^3$/100 g or more and 110 cm$^3$/100 g or less.

2. The charging roll for an electrophotographic device according to claim 1, wherein, in the elastic layer, the first phase constitutes a sea phase, and the second phase constitutes an island phase.

3. The charging roll for an electrophotographic device according to claim 1, wherein a content ratio of the carbon black A to the carbon black B in the second phase is 3.0 or more and 10.0 or less in terms of mass ratio.

4. The charging roll for an electrophotographic device according to claim 1, wherein the carbon black A has a specific surface area of 25 m$^2$/g or more and 75 m$^2$/g or less, and the carbon black B has a specific surface area of 140 m$^2$/g or more and 180 m$^2$/g or less.

5. The charging roll for an electrophotographic device according to claim 1, wherein the carbon black A has an average particle diameter of 35 nm or more and 75 nm or less, and the carbon black B has an average particle diameter of 20 nm or more and 30 nm or less.

6. The charging roll for an electrophotographic device according to claim 1, wherein, relative to 100 parts by mass of a polymer component in the elastic layer, a content of the carbon black A is 5 parts by mass or more and 75 parts by mass or less, and a content of the carbon black B is 1.5 parts by mass or more and 20 parts by mass or less.

7. The charging roll for an electrophotographic device according to claim 1, wherein the first phase contains a non-polar polymer, and the second phase contains a polar polymer.

8. The charging roll for an electrophotographic device according to claim 7, wherein the non-polar polymer is isoprene rubber or natural rubber, and the polar polymer is nitrile rubber or hydrin rubber.

9. The charging roll for an electrophotographic device according to claim 1, wherein, in an arbitrary 5 μm×5 μm range of the elastic layer, an abundance ratio of the first phase to the second phase is 0.3 or more and 20 or less in terms of area ratio.

10. The charging roll for an electrophotographic device according to claim 1, wherein the first phase is interposed between the second phase and the top layer.

11. A method for manufacturing the charging roll for an electrophotographic device according to claim 1, wherein, with respect to a polymer component constituting the second phase, the two types of carbon black: the carbon black A and the carbon black B are kneaded together, and then a polymer component constituting the first phase is kneaded in.

* * * * *